(12) United States Patent
Caver

(10) Patent No.: US 9,104,205 B1
(45) Date of Patent: Aug. 11, 2015

(54) AUTOMATED RETURN SHOPPING CART

(71) Applicant: Fred Caver, Brooklyn, NY (US)

(72) Inventor: Fred Caver, Brooklyn, NY (US)

(*) Notice: Subject to any disclaimer, the term of this patent is extended or adjusted under 35 U.S.C. 154(b) by 38 days.

(21) Appl. No.: 14/161,640

(22) Filed: Jan. 22, 2014

(51) Int. Cl.
*G01C 22/00* (2006.01)
*G05D 1/02* (2006.01)

(52) U.S. Cl.
CPC .................... *G05D 1/0225* (2013.01)

(58) Field of Classification Search
CPC .................................................... G05D 1/0225
USPC ............................................................ 701/23
See application file for complete search history.

(56) References Cited

U.S. PATENT DOCUMENTS

| | | | |
|---|---|---|---|
| 5,517,412 A | 5/1996 | Unoura | |
| 5,528,888 A | 6/1996 | Miyamoto | |
| 6,390,213 B1 | 5/2002 | Bleicher | |
| 8,346,480 B2 | 1/2013 | Trepagnier | |
| 8,437,947 B2 | 5/2013 | Yoo | |
| 2004/0260467 A1* | 12/2004 | Wehrlen et al. | 701/213 |
| 2008/0238009 A1* | 10/2008 | Carpenter | 280/33.992 |
| 2012/0282065 A1 | 11/2012 | Virk | |
| 2012/0296751 A1* | 11/2012 | Napper | 705/23 |
| 2012/0303202 A1 | 11/2012 | Durkos | |
| 2015/0051994 A1* | 2/2015 | Ward et al. | 705/23 |
| 2015/0095161 A1* | 4/2015 | Goel | 705/14.64 |

\* cited by examiner

*Primary Examiner* — Hussein A. Elchanti
(74) *Attorney, Agent, or Firm* — The Keys Law Firm PLLC

(57) ABSTRACT

An automated return shopping cart for enabling a shopping cart to sense when it is not in use and automatically return itself to a cart corral area when it is not in use. The automated return shopping cart comprises a conventional shopping cart modified to include an automation component, which includes the programmable logic controller, a rechargeable battery, the powertrain components, and brakes, interconnected with a GPS component, object sensors, activity sensors, two docking ports, a touchscreen, and a WiFi component. Whenever the cart is not in use, the automation component causes the cart to be moved back to a desired location, using the GPS component to determine the route based on the location of the desired destination. While in route to the desired destination, object sensors are used to detect objects in the current and potential path of the cart, enabling the cart to avoid the objects.

9 Claims, 1 Drawing Sheet

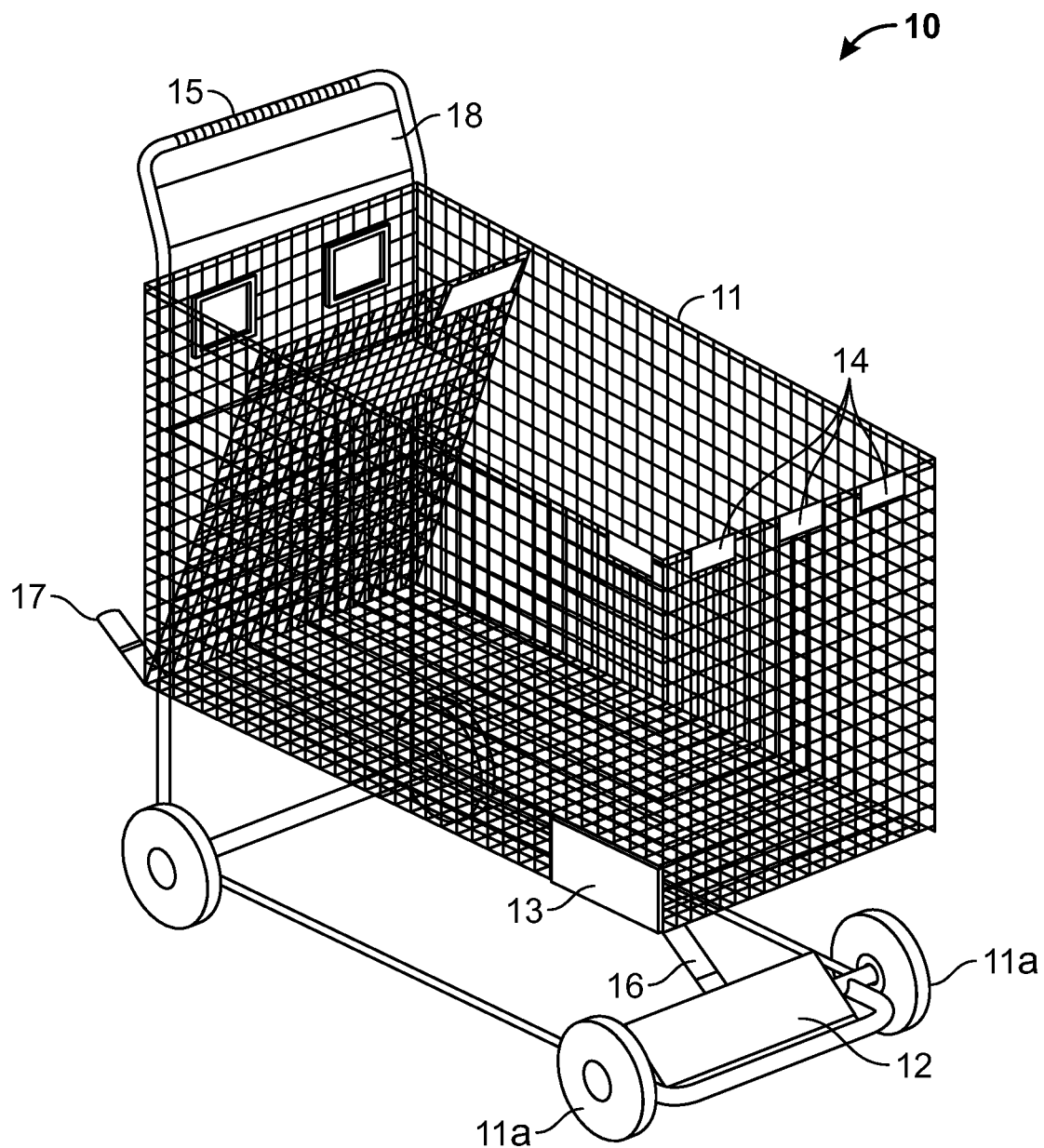

AUTOMATED RETURN SHOPPING CART

BACKGROUND OF THE INVENTION

1. Field of the Invention

This invention relates generally to a shopping cart and, more particularly, to a modified shopping cart which automatically returns to a desired location when not in use.

2. Description of the Prior Art

The use of shopping carts in retail shopping is well known. Shoppers at grocery stores or other retail outlets often utilize such carts to gather their items in the retail outlet and also to carry their purchased items to a vehicle when they depart. A problem which is created by such customary use of shopping carts is that once carts are used, the shoppers often leave carts where they last used them, which is typically scattered all over a parking lot. Consequently, the retail outlet must typically employ workers specifically to round up and return carts to a desired location (or have workers stop performing other tasks to do the same) so they may be easily accessed by future shoppers.

Thus, there remains a need for a shopping cart which would eliminate the need for retail workers to manually round up shopping carts after use and return them to a desired location. It would be helpful if such an automated return shopping cart was motorized to enable it to propel itself when required. It would be additionally desirable for such an automated return shopping cart employed global positioning system ("GPS") components and sensors to enable shopping carts to navigate themselves to a predetermined, desired location while avoiding pedestrians and vehicles.

The Applicant's invention described herein provides for a motorized shopping car adapted to automatically propel itself to a predetermined, desired location at a retail outlet when not in use by a shopper. The primary components of Applicant's automated return shopping cart are a base cart modified to include a power source, a GPS system, sensors for detecting objects, sensor for detecting use activity, and a programmable logic controller. When in operation, the automated return shopping cart automatically recognizes when it is no longer in use and returns itself to a desired location to wait to be used again. As a result, many of the limitations imposed by cart corralling procedures of the prior art are removed.

SUMMARY OF THE INVENTION

An automated return shopping cart for enabling a shopping cart to sense when it is not in use and automatically return itself to a cart corral area when it is not in use. The automated return shopping cart comprises a conventional shopping cart modified to include an automation component, a GPS component, object sensors, activity sensors, two docking ports, a touchscreen, and a WiFi component. The automation component, which includes the programmable logic controller, a rechargeable battery, the powertrain components, and brakes, is wired to the GPS component, object sensors, activity sensors, docking ports, touchscreen, and WiFi component, enabling the provision and receipt of electrical power with the battery and electrical signals with said components. When in use, the automated return shopping cart operates in substantially the same manner as a conventional shopping cart, except it additionally allows for the display of advertisements or for users of the automated return shopping cart to access content, including without limitation websites or movies, from the Internet.

Whenever the activity sensors sense that the cart is not in use, the automation component causes the cart to be moved back to a desired location, typically the cart corral area. While being propelled to the cart corral area, the GPS component determines the route based on the location of the desired destination. While in route to the desired destination, object sensors are used to detect objects in the current and potential path of the cart. When objects are detected, an alternate route which avoids the objects is calculated and employed.

Once the cart makes it back to the cart corral area it is docked with its docking components to allow the battery to recharge. Thus, when a shopper takes the cart seeking to utilize it, electrical power has been stored to power the subsequent operation of the cart.

It is an object of this invention to provide a shopping cart which would eliminate the need for retail workers to manually round up shopping carts after use and return them to a desired location.

It is another object of this invention to provide an automated return shopping cart motorized to enable it to propel itself when required.

It is yet another object of this invention to provide an automated return shopping cart employing GPS components and sensors to enable shopping carts to navigate themselves to a predetermined, desired location while avoiding pedestrians and vehicles.

These and other objects will be apparent to one of skill in the art.

BRIEF DESCRIPTION OF THE DRAWINGS

FIG. 1 is a side perspective view of an automated return shopping cart built in accordance with the present invention.

DETAILED DESCRIPTION OF THE INVENTION

Referring now to the drawings and in particular FIG. 1, an automated return shopping cart 10 is shown as a conventional shopping cart 11 modified to include an automation component 12, a GPS component 13, object sensors 14, activity sensors 15, a male docking port 16, a female docking port 17, an LCD touchscreen 18, and a WiFi component 19. The automation component 12 includes the programmable logic controller, a rechargeable battery, the powertrain components, and brakes. The automation component 12 is wired to said GPS component 13, object sensors 14, activity sensors 15, a male docking port 16, a female docking port 17, an LCD screen 18, and a WiFi component 19 so as to enable the provision and receipt of electrical power with the battery and electrical signals with said components. In this regard, the programmable logic controller is able to monitor the activity and signal outputs from all of the electronic components of the automated return shopping cart 10 and utilize and/or control the operations thereof and the battery is able to supply electrical power and receive electrical power when being recharged as detailed below.

The automated return shopping cart 10 operates in substantially the same manner as a conventional shopping cart when in use, except it additionally includes an LCD touchscreen 18 and a WiFi component 19 which allow for the display of advertisements or for users of the automated return shopping cart 10 to access content, including without limitation websites or movies, from the Internet. The LCD touchscreen 18 additionally provides a optical user interface for the automation component 12. The LCD touchscreen 18 and the WiFi component 19 receive electrical power from an electrical connection with the automation component 12 and the LCD touchscreen 18 accesses the Internet through the WiFi component 19 by way of each respective component's connection to the automation component 12. Advertisements on the LCD touchscreen 18 may originate on from memory in the automation component 12 or from the Internet.

Whenever the activity sensors 15, embodied as pressure sensors, in the handle bar of the cart 11 sense that no one has touched the handle bar for ten minutes, the activity sensors 15 notify the automation component 12 that the cart 11 is not in use. When notified the cart 11 is not in use, the automation component 12 causes the powertrain components, which include a motor, differentials, and drive shafts, to rotate the front wheels 11*a* of the cart 11. By this action, the cart 11 is propelled. It is contemplated that the cart 11 may be propelled forward or backward by this action through the control of the motor's direction, and that steering is accomplished through action the differentials to cause the wheels 11*a* to spin at different speeds.

While being propelled, the GPS component 13 is used by the automation component 12 to determine the desired destination. It is contemplated that the desired destination at a typical retail outlet would be a cart storage and recharging area wherefrom customers would be able to access carts 11 to use. The automation component 12 may additionally include a map of the retail outlet's inside and outside area to assist a cart 11 navigate from a location to the desired location.

While in route to the desired destination, object sensors 14 are used by the automation component 12 to detect objects in the current and potential path of the cart 11. The object sensors 14 include motion sensors and light sensors to detect objects in the path of the cart. When objects are detected, the object sensors 14 activate green and red lights embedded therein to provide a visual notification that the cart 11 is in motion as also notify the automation component 12 so that an alternate route which avoids the objects can be calculate and employed.

Once the cart 11 is back to the cart corral area, cart is parked in a location which enables its female docking port 17 to engage an available male docking port 16 on another, already parked cart, or which is fixed in the cart corral area for carts 11 to connect to. While the female docking port 17 is engaged, the battery in the automatic component 12 is supplied with electrical power to recharge. When a second cart's 11 female docking port 17 is engaged to the male docking port 16 of a cart which is currently recharging as described, electrical power is additionally supplied to the second cart 11 is able to recharge simultaneously. Thus, when a shopper takes the cart seeking to utilize it, electrical power has been stored to power the subsequent operation of the cart 11.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An automated return shopping cart, comprising:
    a shopping cart;
    an automation component having at least a programmable logic controller, a rechargeable battery, the powertrain components, and brakes, wherein said automation component is mechanically connected to at least two wheels of the shopping cart;
    a GPS component disposed on said shopping cart and electrically connected to said automation component;
    at least one object sensor disposed on said shopping cart and electrically connected to said automation component, wherein said object sensor is configured to detect objects in front of said shopping cart;
    an activity sensor disposed on a handle of said shopping cart and electrically connected to said automation component, wherein said activity sensor is configured to detect whenever said handle is being contacted;
    a first docking port disposed on said shopping cart and electrically connected to said automation component, wherein said first docking component is configured to direct electrical power supplied thereto to said battery; and
    wherein said automation component is configured to create a desired path to a desired destination using data from said GPS component, propel said cart to the desired destination after receiving a signal from said activity sensor, and avoid objects in the desired path using signals from said object sensors.

2. The automated return shopping cart of claim 1, additionally comprising:
    a video screen disposed on said shopping cart and electrically connected to said automation component;
    a WiFi component disposed on said shopping cart and electrically connected to said automation component; and
    wherein said video screen and said WiFi component enable the display of advertisements or content from the Internet.

3. The automated return shopping cart of claim 2, wherein said video screen is a touch screen.

4. The automated return shopping cart of claim 1, wherein said automation component is connected to the two front wheels of said shopping cart.

5. The automated return shopping cart of claim 1, additionally comprising a second docking port disposed on said shopping cart and electrically connected to said first docking port, wherein said second docking port is configured to enabled the provision of electrical power from said first docking port to another object connected thereto.

6. The automated return shopping cart of claim 1, wherein said object sensors additionally include a plurality of lights.

7. The automated return shopping cart of claim 1, wherein said activity sensor is defined by a pressure sensor and includes a timing mechanism.

8. The automated return shopping cart of claim 1, wherein said object sensors include motion sensors.

9. The automated return shopping cart of claim 1, wherein said object sensors include light sensors.

* * * * *